United States Patent
Galindo

(10) Patent No.: US 10,757,917 B2
(45) Date of Patent: Sep. 1, 2020

(54) ASSISTIVE PET BATH

(71) Applicant: Gracie Galindo, Azle, TX (US)

(72) Inventor: Gracie Galindo, Azle, TX (US)

( * ) Notice: Subject to any disclaimer, the term of this patent is extended or adjusted under 35 U.S.C. 154(b) by 0 days.

(21) Appl. No.: 14/836,534

(22) Filed: Aug. 26, 2015

(65) Prior Publication Data
US 2018/0020639 A1 Jan. 25, 2018

(51) Int. Cl.
*A01K 13/00* (2006.01)

(52) U.S. Cl.
CPC .................. *A01K 13/001* (2013.01)

(58) Field of Classification Search
CPC ...... A61D 3/00; A01K 1/0353; A01K 1/0613; A01K 13/001; A61G 1/013; A61G 13/105; A61G 7/1051
USPC ...... 119/757, 756, 725, 728, 674, 676, 28.5; 297/16.1, 16.2, 282, 284.3, 312, 47, 54
See application file for complete search history.

(56) References Cited

U.S. PATENT DOCUMENTS

| | | | | |
|---|---|---|---|---|
| 1,366,178 A * | 1/1921 | Hatch | ............... | A61D 3/00 119/725 |
| 2,183,470 A * | 12/1939 | Speckels | ............... | A61D 3/00 119/725 |
| 2,536,268 A * | 1/1951 | Dillon | ............... | A22B 5/06 452/194 |
| 4,003,341 A * | 1/1977 | La Croix | ............... | A01K 13/00 119/756 |
| 4,034,426 A * | 7/1977 | Hardwick | ............... | A61G 7/1011 4/564.1 |
| 4,148,280 A * | 4/1979 | Masuda | ............... | A61D 3/00 119/757 |
| 4,428,326 A * | 1/1984 | Dubovick | ............... | A61D 3/00 119/727 |
| 4,567,853 A * | 2/1986 | Hayden | ............... | A61D 3/00 119/725 |
| 4,889,383 A * | 12/1989 | Jones | ............... | A47C 4/02 297/16.1 |
| 5,009,196 A * | 4/1991 | Young | ............... | A61D 3/00 119/728 |
| 5,140,947 A * | 8/1992 | Bruce | ............... | A01J 7/04 119/502 |
| 5,146,635 A * | 9/1992 | Gastle | ............... | A61D 3/00 108/118 |
| 5,158,041 A * | 10/1992 | Schmitz | ............... | A01K 1/0613 119/751 |
| 5,213,062 A * | 5/1993 | Canady, Jr. | ............... | A61D 3/00 119/755 |
| 5,219,369 A * | 6/1993 | Gastle | ............... | A61D 3/00 119/757 |
| 5,301,377 A * | 4/1994 | Kim | ............... | A47C 17/645 5/110 |

(Continued)

Primary Examiner — Yvonne R Abbott-Lewis
(74) Attorney, Agent, or Firm — James E. Walton

(57) ABSTRACT

A pet bathing apparatus is disclosed. The disclosed apparatus comprises of two bottom rods, two top rods, top and bottom connecting vertical rods, adjusting extendable rods, width adjusting rods connecting bottom rods and straps connecting top rods to hold the animal in the bath tub. The bathing apparatus is made of strong plastic or metal that will not scratch the bath tub but will be strong enough to hold the weight. The bathing apparatus is designed specifically to assist pet owners in bathing their handicapped pets, or pet with missing limbs. The disclosed bathing apparatus can be easily folded and stored.

10 Claims, 1 Drawing Sheet

(56) References Cited

U.S. PATENT DOCUMENTS

| | | | | |
|---|---|---|---|---|
| 5,339,471 A * | 8/1994 | Lanzara | A47C 20/025 | 5/110 |
| 5,729,845 A * | 3/1998 | Hsu | A45F 3/24 | 5/120 |
| 5,782,684 A * | 7/1998 | Shaff | A22B 5/161 | 452/128 |
| 5,785,006 A * | 7/1998 | Prentice | A01K 1/0613 | 119/723 |
| 5,823,146 A * | 10/1998 | Alaniz | A01K 15/00 | 119/725 |
| 6,230,662 B1 * | 5/2001 | Miale | A61D 3/00 | 119/724 |
| 6,406,095 B1 * | 6/2002 | Bouchard | A47C 3/0255 | 297/270.1 |
| 6,591,778 B1 * | 7/2003 | Alderman | A01K 1/0353 | 119/28.5 |
| 6,986,445 B1 * | 1/2006 | Stockman | A45F 4/02 | 224/155 |
| 7,178,868 B2 * | 2/2007 | Richardson | A47C 9/027 | 297/195.11 |
| 7,806,089 B2 * | 10/2010 | Walker-Indyke | A01K 15/00 | 119/753 |
| 7,984,697 B2 * | 7/2011 | Grbic | A01K 1/04 | 119/756 |
| 8,038,158 B1 * | 10/2011 | White | A47D 13/08 | 280/32.5 |
| 8,281,430 B1 * | 10/2012 | Hough | A61G 7/1051 | 5/625 |
| 8,702,162 B2 * | 4/2014 | Isaacson | A47C 4/20 | 297/16.1 |
| 8,746,637 B2 * | 6/2014 | Liu | A45B 9/00 | 135/139 |
| 8,806,676 B2 * | 8/2014 | Reeb | A45F 3/24 | 5/120 |
| 2004/0025795 A1 * | 2/2004 | Miale | A61D 3/00 | 119/28.5 |
| 2016/0014994 A1 * | 1/2016 | Ma | A01K 1/0035 | 119/498 |

* cited by examiner

ASSISTIVE PET BATH

FIELD OF THE INVENTION

The present invention relates to the field of bathing apparatus and more particularly relates to a bathing apparatus specifically designed for handicapped pets or pets having mobility constraints.

BACKGROUND OF THE INVENTION

In a typical domestic environment, dogs are washed in bathtubs, shower stalls, or laundry tubs or bins by their owners. Moreover, bathing a dog may be difficult if the dog becomes frightened, anxious or otherwise difficult to control. A problem currently exists for bathing handicapped dogs or dogs having difficulty with mobility of their limbs making bathing the dog a difficult task; since these pets generally face problems in standing, or getting a bath as they cannot move properly, bathing a handicapped pet becomes a cumbersome process for the pet owner, especially if the dog is of a large breed.

The prior art has shown various apparatuses that solve problems for pet bathing. The Powers U.S. Pat. No. 6,935,276 B2 describes an apparatus, system and a method for supporting an animal during grooming of the animal. The apparatus may have a base which may be placed on a wash tub having drainage into the wash tub below, supported by a leg and a pair of side walls of the wash tub wherein the leg may have an adjustable length which may allow the leg to push against the wash tub and the animal may be placed on top of the base with the leg and/or may be groomed while on the base.

A pet bathing system is disclosed in Patent No US 20150020754 A1. The system provides improved pet bathing for quadruped animals including feline species possessing claws and an aversion to water, the invention further retains feline pets during bathing in a manner that is safe for both owner and animal.

Also, various prior art apparatuses have been designed in solves mobility issues with pets. The Moore U.S. Pat. No. 7,325,516 B2 describes a mobility assistance vest for pets. The Patent Kissel No US 20140174379 A1 describes a harness system for pets with mobility handicap wherein a paw pad protector harness lightweight assembly of straps and buckles are used to hold a variety of pet footwear securely in place for weather condition protection, and for protecting pet paws and legs from exposure to hazardous environments. The U.S. Pat. No. 7,284,504 B1 discloses method of carrying and assisting movement of a dog using an elongated carrying strap.

Therefore, a need exists for an apparatus that solves problems for pets having difficulty in mobility or handicapped pets that need to be bathed. The present invention solves these problems by providing a bathing pet apparatus for handicapped pets or pets with difficulty moving, or pets having missing limbs etc., that is simple and easy to use regardless of the size of the breed.

SUMMARY

The present invention provides a modified pet bathing apparatus specifically designed for handicapped pets or pets having mobility issues. The disclosed apparatus comprises of two bottom rods, two top rods, top and bottom connecting vertical rods, adjusting extendable rods, width adjusting rods connecting bottom rods and straps connecting top rods to hold the animal in the bath tub. The bathing apparatus is made of strong plastic or metal that will not scratch the bath tub but will be strong enough to hold the weight of the animal. The bathing apparatus is designed specifically to assist pet owners in bathing their handicapped pets, or pets with missing limbs. The disclosed bathing apparatus can be easily folded and stored.

Therefore, it is an object of the present invention to provide a pet bathing apparatus that can easily fit inside a bathing tub for bathing handicapped pets or pets having mobility issues.

It is another object of the present invention to provide an improved pet bathing apparatus that can be easily dismantled and stored when not in use.

BRIEF DESCRIPTION OF THE DRAWINGS

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention will be described and explained with additional specificity and detail through the use of the accompanying drawing in which.

DETAILED DESCRIPTION OF THE INVENTION

Figure 1:
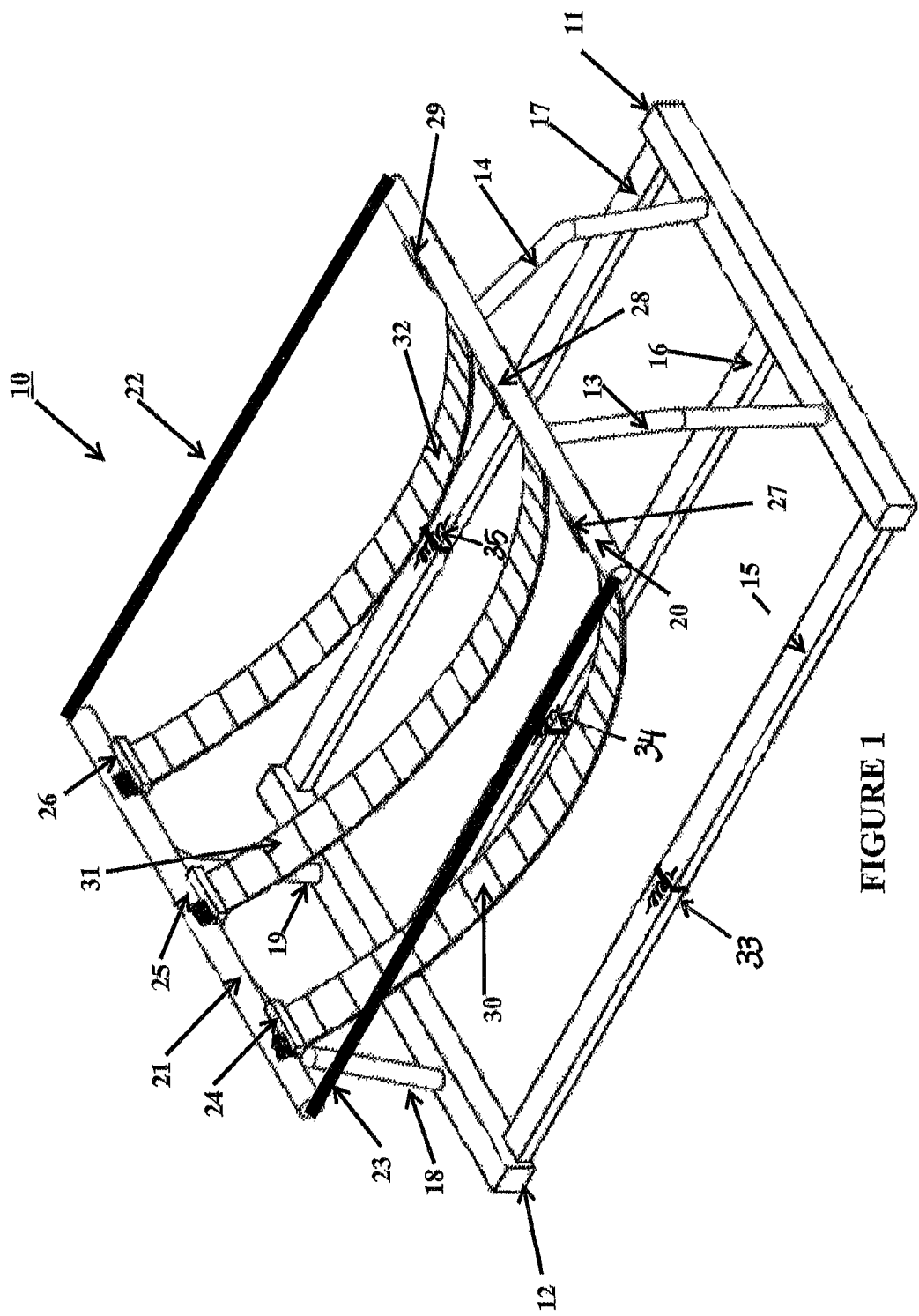
FIG. 1 is a perspective view of the dog pet bath in accordance with the present invention.

Referring now to FIG. 1, the present invention discloses a pet bathing apparatus 10 to be used for bathing of handicapped pets or pets having mobility issues. The bathing apparatus 10 is comprised of a various rods running parallel to each other to provide the apparatus a stable setup. The apparatus 10 comprises of two long rods 11, 12 in the bottom and two long rods 20, 21 at the top connected with each other through a series of parallel running vertical rods 13, 14, 18, 19. The pet bathing apparatus 10 may be made from a material that will not scratch or mark the tub but will also place enough pressure on the sides of tub to hold bars next to the tub. The two long rods 11, 12 at the bottom will run along the bottom sides of a bathtub (not shown). These rods are attached to the rods at the top 20, 21 along each side of the tub with the help of vertical rods 13, 14, 18, 19. Similar to the bathing apparatus 10, the bottom rods are made by metal or strong plastic material and a material that will not scratch or mark the tub.

Referring now to FIG. 1, the lower or bottom rods 11, 12 will have other rods 15, 16 and 17 going across the rub that can be adjusted to the width of the bathtub. Likewise, these rods 15, 16 and 17 next to the side of the bathtub will be pushed against the sides to put pressure for support. The rods 15, 16 17 that connect the two sides 11, 12 will be able to be inwardly adjusted by having a provision of internal springs 33, 34, 35 that can be pushed in place. More specifically, the distance between rods 11, 12 that run across the bottom of the bathtub are adjusted to a width of the bathtub in order to put pressure on the sides rods 11 and 12 to make it stay in place. The rods 15, 16 and 17 running in the width of the bathtub are able to be folded up to place the two sides 11, 12 together for easy storage. The provided rods 15, 16, 17 will be long enough to make it store easily behind a door or some other slender place by pushing the two sides 11, 12 and 20, 21 together.

The present invention also disclosed use of straps to be attached between the top sides 20, 21 of the bathing apparatus 10 when placed in a bathtub. Turning once again to FIG. 1, the straps 30, 31, 32 are attached at opposite fastening points provided on both the sides 11, 12. The fastening points 24, 25, 26 provided in one rod 21, are attached to respective hooks 27, 28, 29 on the opposite rod 20. The straps 30, 31, 32 work like a seatbelt and can be readjusted by pushing back into fastening points 24, 25, 26 and attaching to hooks 27, 28, 29 at a desired length. Moreover, the straps 30, 31, 32 can be pulled up and down to adjust according to the height of the dog. Additionally, the straps 30, 31, 32 can be pulled across the width of the bathtub as much as is needed to support the weight of the pet. It should be understood that the provided straps will be attached to the other side of the apparatus underneath the pet and are able to retract and catch the pet when the desired amount needed is finalized. The straps are designed to have enough width and strength to support the weight of the pet so the pet can relax and avoid falling or getting injured.

As disclosed, the provided bathing apparatus 10 will fit into a bathtub length-wise, usually a size half or less than the length of the bathtub. The two sides 11, 12 and 20, 21 close together for storage and the lower bars 15, 16, 17 along the bottom width of the tub will be dismantled and adjusted for storage. The provided lower bars 15, 16, 17 along the bottom width will be adjusted to push against the bottom rods 11, 12 on the sides of the bathtub to create pressure to maintain the stability of the apparatus in the same position. The top rods 20, 21 attached to the side of tub are provided to safely and securely allow the pet to enter into the bathing apparatus 10 and are strong enough to avoid bending or folding when the pet is inside the bathtub. The bathing apparatus 10 will also be provided with additional adjustable bars 22, 23 on the top of the apparatus 10 to put pressure on the top section of the apparatus 10 that can further be adjusted according to the height of the pets by vertical bars 13, 14, 18, 19. Although not shown it should be understood that the top horizontal rods 20 and 21 of apparatus 10 may be increased in height by adjusting the sides in order to accommodate taller dogs. Additionally, on any rod next to the outside of the tub, there may be an additional "hook" (not shown) to wrap around the open side of the tub for added stability.

In summary, the present invention provides the user with an apparatus for bathing of handicapped pets or pets with mobility issue as and when required. The purpose of the invention is to provide a user friendly, easy to use pet bathing apparatus. Although the invention has been explained in relation to its preferred embodiment, it is to be understood that many other possible modifications and variations can be made without departing from the spirit and scope of the invention.

What is claimed is:

1. A pet bathing apparatus that easily fits into a bathtub, comprising:
    two parallel running rods at a bottom;
    two parallel running rods at a top;
    generally vertical connecting rods; and
    three adjustable parallel rods connecting the two bottom parallel rods.

2. A pet bathing apparatus according to claim 1, wherein the parallel running rods at the bottom are made of strong plastic or metal that will run along the bottom sides of the bathtub.

3. A pet bathing apparatus according to claim 1, wherein the parallel running rods at the top are made of strong plastic or metal that will run along top sides of the bathtub.

4. A pet bathing apparatus according to claim 1, wherein the bottom rods are attached with top rods by vertical connecting rods, wherein the vertical connecting rods are made of strong plastic or metal that will run along each side of the tub vertically.

5. A pet bathing apparatus according to claim 1, further comprising:
    two additional adjustable parallel rods that connect the top parallel rods, wherein the two additional adjustable parallel rods extend past the top parallel rods.

6. A pet bathing apparatus according to claim 1, wherein the length of the adjustable rods are capable to be adjusted, wherein the width adjusting rods have a spring mechanism within them.

7. A pet bathing apparatus according to claim 1, further comprising:
    straps between and attached to the top parallel rods for holding the pet.

8. A pet bathing apparatus according to claim 7, wherein the straps are attached between the top sides of the bathing apparatus when placed in the bathtub.

9. A pet bathing apparatus according to claim 7, wherein the straps are attached to a casing point on one side of top and to hook on the other side of the top.

10. A pet bathing apparatus according to claim 7, that easily fits into the bathtub, to conveniently bathe the handicapped pet or pet with missing limbs, wherein the apparatus can be easily folded and stored by folding the width adjusting rods running between bottom rod, to put together two side for storage.

* * * * *